Jan. 10, 1961  W. E. ALTMANN  2,967,438
SELF-LOCKING DIFFERENTIAL GEAR
Filed May 28, 1958  2 Sheets-Sheet 1

INVENTOR.
WERNER E. ALTMANN
BY Dicke and Craig
ATTORNEYS

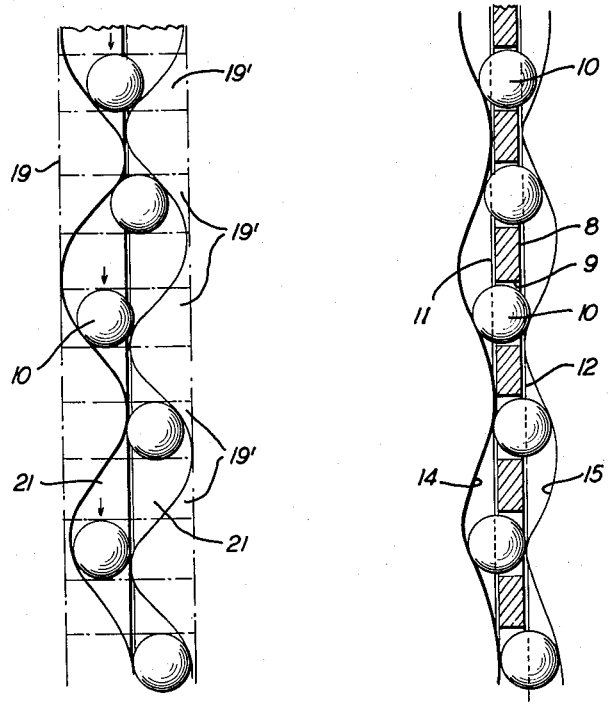

United States Patent Office 2,967,438
Patented Jan. 10, 1961

2,967,438

SELF-LOCKING DIFFERENTIAL GEAR

Werner E. Altmann, Stuttgart, Germany, assignor to Daimler-Benz Aktiengesellschaft, Stuttgart, Germany Filed May 28, 1958, Ser. No. 738,338

16 Claims. (Cl. 74—650)

The present invention relates to a self-locking differential gear, especially for motor vehicles, in which both driven sides are provided with curved tracks or channels having different angles of inclination on which rolling bodies or sliding bodies roll or slide thereby enabling relative movement between the two driven sides.

A more extensive explanation of the basic structure and operation of the differential gear described herein is found in applicant's copending application Serial No. 680,310, filed on August 26, 1957, and entitled "Differential Gear," of which the present application is an improvement as to certain details thereof.

Differential gears are known in which the equalizing action or effect may be locked automatically. This has the purpose of transmitting a driving torque to the road surface even when one of the two vehicle wheels slips or spins as a result of insufficient road traction. The locking is accomplished thereby that rolling or sliding bodies are arranged in one driving member which roll or slide along a curved track provided in or coordinated to the two driven sides and having different angles of inclination. Balls, for instance, may be used as the rolling bodies. The curved tracks or channels are advantageously formed as sinusoids having different numbers of high and low points on each driven side.

This structural difference of the two driven sides results in an unsymmetrical or asymmetrical drive. Extensive tests made in connection therewith have shown that, due to this unsymmetry, highly undesirable consequences arise with respect to the driving operation. For instance, a variable locking value of both wheels results therefrom which, in turn, has as consequence an uneven wear of the tires.

The present invention aims at removing this harmful condition. The problem according to the present invention is solved in that with a differential gear of the type mentioned hereinabove, means are provided at least at one driven side for equalizing the different locking values which are produced as a result of the different angles of inclination of the tracks. The equalizing means is preferably coordinated to the driven side that has the smaller locking value.

A preferred solution according to the present invention is obtained by a construction in which equalizing means are provided at both driven sides and in which these equalizing means are constructed differently from each other for the two driven sides. This means in practice that an existing unsymmetry is compensated by the provision of a further additional unsymmetry.

According to the present invention, the additional equalizing means are advantageously formed as truncated cone-shaped friction surfaces. The friction surface with the larger frictional resistance is thereby coordinated to or used with the driven side having the smaller locking value. The friction surfaces may, therefore, be different with respect to their size, inclination and frictional value, i.e., may be different with respect to one or more of these values or variables.

A differential gear may be obtained with a construction in accordance with the present invention which has the same locking value for both driven sides. The locking action of the gear is altogether improved by the additional friction surface. Furthermore, uneven wear of the tires can no longer occur with such an improved arrangement.

Accordingly, it is an object of the present invention to provide a differential gear with which uniform torque can be transmitted to the road surface even if one of the vehicle wheels spins due to insufficient traction.

Another object of the present invention resides therein that the locking value of both vehicle wheels is equal at all times resulting in even wear of the tires.

Still another object of the present invention resides therein that equalizing of the wheel locking values is accomplished by relatively inexpensive means requiring relatively few parts that may be readily assembled.

These and other objects, features and advantages of the present invention will become more obvious from the following description when taken in connection with the accompanying drawing which shows, for purposes of illustration only, two embodiments in accordance with the present invention, and wherein.

Figure 1:
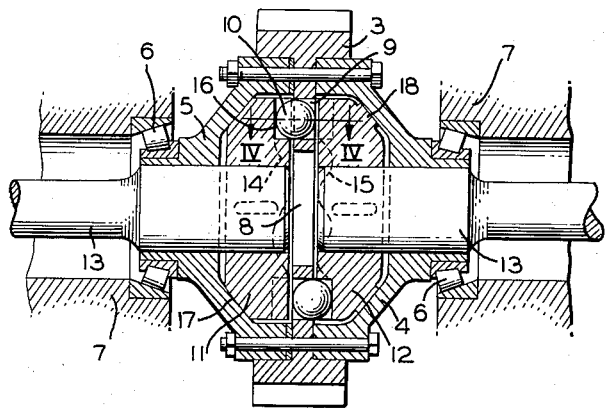
Figure 1 is an axial cross-sectional view taken through a self-locking differential gear in accordance with the present invention which is driven over a spur gear.
Figure 2:
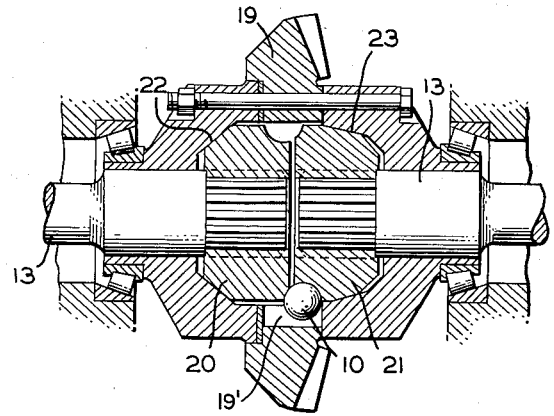
Figure 2 is an axial cross-sectional view of a different embodiment of a differential gear in accordance with the present invention which is driven over a bevel gear.

Figure 3 is a plan view taken in the radial direction toward parts 20 and 21 of Figure 2, and illustrating the annular configuration of these parts, normally arranged in the circumferential direction, as developed in a single plane, namely the plane of Figure 3, and Figure 4 is a cross-sectional view, taken along line IV—IV of Figure 1 and showing an annular cross section about the axis of the differential of Figure 1 developed in a single plane, namely the plane of Figure 4.

Referring now to the drawing, wherein like reference numerals are used throughout the various views to designate like parts, and more specifically to Figures 1 and 4, reference numeral 3 designates a large spur gear for driving the differential gear and to which are attached on both sides thereof, in any suitable manner, for example, by means of bolts, symmetrical housing members 4 and 5. The rotating housing 3, 4 and 5 formed thereby is supported in the stationary housing 7 of the whole differential gear unit by means of bearings 6. The drive of the differential gear takes place by means of a pinion (not shown) in engagement with the spur gear 3. The spur gear 3 at the same time serves as a carrier for the rolling bodies and is provided with a flange 8 extending radially inwardly in which bores or apertures 9 are provided extending clear therethrough in the axial direction thereof. Balls 10 are retained in these bores 9 which serve as rolling bodies of the gear.

Driven members 11 and 12 are arranged within the rotating housing 3, 4, 5 on each side of the flange 8 which are positively connected to the half-shafts or half-axles 13 by means of which the vehicle wheels (not shown) are driven. These driven members 11 and 12 are provided with curve tracks or channels 14 and 15 which have different angles of inclination and are constructed in such a manner that track 14, for instance, is provided with five high and low points, while the track 15 is provided with six high and low points. Consequently, both tracks produce together theoretically eleven points of intersection which are equally spaced one from the other. The balls 10 are arranged in these 11 points of intersection. The curve tracks or channels 14 and 15 have flat track surfaces 16 as viewed in an axial cross section along which the balls 10 roll.

As a result of the different angles of inclination of the curve tracks or channels 14 and 15, an unequal locking value occurs for the two driven sides. In order to equalize this unsymmetry, special equalization means are provided. For this purpose, the disk-shaped driven members 11 and 12 are provided with friction surfaces which are appropriately of truncated cone shape. The driven members 11 and 12 are provided at the outer surfaces thereof disposed oppositely the track surfaces with truncated cones 17 and 18 which abut from the inside against corresponding surfaces of truncated conical shape provided at the inner walls of the housing members 4 and 5. The surfaces 17 and 18 of truncated conical shape are different in size and more particularly the arrangement is so chosen that the driven member 11 with the track 14 having the smaller angles of inclination is provided with the truncated cone surface 17 having the larger frictional resistance. The locking value of the gear is altogether increased by the frictional contact surface. Above all, however, the uneven locking value of the two driven sides produced as a result of their unsymmetrical track surfaces is compensated for by the equalizing means described so that the drive or transmission of torque takes place uniformly on both sides.

The different frictional resistances may also be obtained by other means. For instance, the construction of the friction surfaces may be such that they are different with respect to the angles of inclination thereof. Such a construction is shown in Figure 2. The basic construction of the embodiment of the differential gear according to Figure 2 is the same as that described above in connection with Figure 1. The drive in this case, however, takes place by means of a bevel gear 19. The balls 10 are arranged in axially directed apertures or recesses 19' (Figures 2 and 3) provided in bevel gear 19 which, in this case, are formed as pockets open toward the inside thereof. In this case, the radial support of the balls 10 must therefore be assumed by the driven members 20 and 21.

The two driven members 20 and 21 are provided on the outer sides thereof with truncated cone-shaped friction surfaces 22 and 23 having different inclinations. The effect thereof is the same as described hereinabove, that is, in addition to an increase in the locking resistance, a locking value extending equally to the two driven sides is obtained thereby.

While I have shown and described two embodiments in accordance with the present invention, it is understood that the same is not limited thereto but is susceptible of many changes and modifications within the scope of the present invention. Thus, the individual features of the present invention and/or of the two embodiments may be exchanged with each other, or may be combined with one another. It is further feasible to make the friction coefficients of the contact surfaces different by providing different configurations for the outer surfaces thereof. The friction surfaces may, of course, be also arranged at other places of the two driven members. Thus, it is obvious that the present invention is susceptible of many changes and modifications, and I, therefore, intend to cover all such changes and modifications as encompassed by the appended claims.

I claim:

1. A self-locking differential gear, particularly for motor vehicles, comprising input means, two driven members, each provided with a curved track means, said track means having unequal numbers of high and low points resulting in unequal angles of inclination for said track means, means including bodies guided within said differential gear and in bearing contact with said track means to transmit torque from said input means to said driven members while simultaneously therewith enabling relative movement between said driven members, and equalizing means at least at one of said driven members for equalizing the different locking values of said driven members produced by the unequal angles of inclination of said curved track means.

2. A self-locking differential gear according to claim 1, wherein said equalizing means is provided at the driven member having the smaller locking value.

3. A self-locking differential gear particularly for motor vehicles, comprising input means, two driven members, each provided with curved track means, said track means having unequal numbers of high and low points resulting in unequal angles of inclination for said track means, means including bodies guided within said gear and in bearing contact with said track means to transmit torque from said input means to said driven members while simultaneously therewith enabling relative movement between said driven members, and equalizing means on both said driven members for equalizing the different locking values of said driven members produced by the unequal angles of inclination of said curved track means.

4. A self-locking differential gear according to claim 3, wherein said equalizing means are formed as friction surfaces of truncated conical shape.

5. A self-locking differential gear according to claim 4, wherein the friction surfaces coordinated to said driven members are of different size thereby resulting in different locking values at each surface.

6. A self-locking differential gear according to claim 4, wherein the angles of inclination of said truncated cone-shaped friction surfaces are made different for each driven member thereby resulting in different locking values for each surface.

7. A self-locking differential gear according to claim 3, wherein the driven member with the smaller locking value is provided with a friction surface having a larger frictional resistance.

8. A self-locking differential gear according to claim 3, wherein said equalizing means include surfaces having different coefficients of friction at the two driven members, respectively.

9. A self-locking differential gear according to claim 3, wherein the members containing said curved tracks are also provided at the same time with friction surfaces constituting said equalizing means.

10. A self-locking differential gear according to claim 8, wherein said friction surfaces are of truncated conical shape.

11. A self-locking differential gear, particularly for motor vehicles, comprising a driving member provided with axial apertures, two driven members, each provided with a sinusoidally shaped track means, said track means having unequal numbers of high and low points thereby resulting in unequal angles of inclination of said track means, means including rolling bodies slidably mounted within said axial apertures and in bearing contact with said track means for transmitting torque from said driving member to said driven members while simultaneously therewith enabling relative movement between said driven members, and means on said driven members for equalizing the different locking values produced by the difference in inclination of said sinusoidally shaped track means.

12. A self-locking differential gear according to claim 11, wherein said sinusoidally shaped track means are each provided with an essentially straight bearing surface portion, as seen in axial cross section, said driven members being disk-shaped and provided at the outer periphery thereof with truncated conical surfaces of equal inclination but of unequal size.

13. A self-locking differential gear according to claim 11, wherein said driven members are disk-shaped and provided with truncated cone surfaces at the outer periphery thereof of unequal inclination but of equal size.

14. A self-locking differential gear, particularly for motor vehicles, comprising a centrally disposed driving gear provided with axial apertures, housing members secured on both sides of said driving gear to form therewith a unitary housing rotating in unison therewith, a plurality of driven members, each provided with a curved track, the tracks of respective driven members having unequal numbers of high and low points resulting in different angles of inclination thereof, means including bodies guided within said apertures and in bearing contact with said tracks to transmit torque from said driving gear to said driven members while simultaneously therewith enabling relative movement between said driven members, and equalizing means on at least one of said driven members for equalizing the different locking values of said driven members produced by the unequal angles of inclination of said curved tracks.

15. A self-locking differential gear according to claim 14, wherein said equalizing means includes a friction surface at said one driven member and at a corresponding housing member in equalizing contact with one another.

16. A self-locking differential gear according to claim 15, wherein two driven members are provided, both including friction surfaces and corresponding friction surfaces within said housing members constituting said equalizing means.

References Cited in the file of this patent

UNITED STATES PATENTS

| 1,282,614 | Miller | Oct. 22, 1918 |
| 1,897,555 | Ford | Feb. 14, 1933 |

FOREIGN PATENTS

| 313,791 | Germany | July 19, 1919 |
| 801,421 | Germany | Jan. 8, 1951 |
| 852,208 | Germany | Oct. 13, 1952 |